(12) United States Patent
Han et al.

(10) Patent No.: US 11,867,932 B2
(45) Date of Patent: Jan. 9, 2024

(54) LIGHT CONTROL FILM HAVING NANO LIGHT ABSORBING LAYER AND DISPLAY USING THE SAME

(71) Applicant: LG Display Co., Ltd., Seoul (KR)

(72) Inventors: JaeJung Han, Paju-si (KR); JaeJin Kim, Paju-si (KR); JinRyun Kim, Paju-si (KR); SeMin Lee, Paju-si (KR); DaeYong Kim, Paju-si (KR); Eunhee Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 867 days.

(21) Appl. No.: 16/913,424

(22) Filed: Jun. 26, 2020

(65) Prior Publication Data

US 2021/0003755 A1 Jan. 7, 2021

(30) Foreign Application Priority Data

Jul. 2, 2019 (KR) .......................... 10-2019-0079485
Dec. 16, 2019 (KR) .......................... 10-2019-0167603

(51) Int. Cl.
*G02B 5/22* (2006.01)
*G02B 5/00* (2006.01)

(52) U.S. Cl.
CPC ............... *G02B 5/22* (2013.01); *G02B 5/003* (2013.01)

(58) Field of Classification Search
CPC .... G02B 5/22; G02B 5/003; G02B 2207/123; G02B 26/00; G02B 26/007; G02B 5/00; H01L 27/15; H01L 51/52; H01L 27/156; H10K 50/85; H10K 50/865
See application file for complete search history.

(56) References Cited

U.S. PATENT DOCUMENTS

| | | | | |
|---|---|---|---|---|
| 9,568,650 | B2* | 2/2017 | Hwang | G02B 1/14 |
| 2010/0328777 | A1* | 12/2010 | Kashiwagi | H01J 11/44 427/510 |
| 2016/0103262 | A1* | 4/2016 | Kashiwagi | G02B 6/0053 362/607 |
| 2016/0124126 | A1* | 5/2016 | Vasylyev | G02B 5/003 359/893 |
| 2017/0108628 | A1* | 4/2017 | Larsen | G02B 1/04 |
| 2018/0052263 | A1* | 2/2018 | Chen | G02B 5/23 |
| 2018/0267358 | A1* | 9/2018 | Choi | H10K 50/858 |
| 2019/0346615 | A1* | 11/2019 | Johnson | G02B 5/00 |
| 2021/0333624 | A1* | 10/2021 | Schmidt | G02F 1/133524 |

* cited by examiner

*Primary Examiner* — Balram T Parbadia
(74) *Attorney, Agent, or Firm* — Fenwick & West LLP

(57) ABSTRACT

The present disclosure relates to a light control film having nano (or nano-scale) light absorbing layer and a display using the same. A light control film according to the present disclosure includes a lower layer having a first axis and a second axis, a middle layer having a predetermined thickness disposed between the lower layer and the upper layer, and a plurality of nano light absorbing layers arrayed with a predetermined intercals along the first axis in the middle layer, each of the nano light absorbing layer having a width along the first axis, a length along the second axis and a height corresponding to the thickness of the middle layer, wherein a ratio between the interval and the width of the nano light absorbing layer is selected from any one of 10:1 to 20:1.

18 Claims, 10 Drawing Sheets

$n_{100} = n_{200} = n_{Pa} > n_{Pb}$

5a ≠ 5b

5a ≠ 5b ≠ 5c $n_{500} \ll n_{300}$

LIGHT CONTROL FILM HAVING NANO LIGHT ABSORBING LAYER AND DISPLAY USING THE SAME

CROSS-REFERENCE TO RELATED APPLICATIONS

This application claims the benefit of Republic of Korea Patent Application No. 10-2019-0079485 filed on Jul. 2, 2019, and Republic of Korea Patent Application No. 10-2019-0167603 filed on Dec. 16, 2019, all of which are hereby incorporated by reference as if fully set forth herein.

BACKGROUND

Field

The present disclosure relates to a light control film having nano (or nano-scale) light absorbing layer and a display using the same. Especially, the present disclosure relates to a light control film for narrowly controlling the viewing angle of the display in a specific direction.

Discussion of the Related Art

Recently, various types of display such as CRT (Cathode Ray Tube), LCD (Liquid Crystal Display), PDP (Plasma Display Panel) and luminescent display have been developed and prospered. These various types of display are used to display image data of various products such as computers, mobile phones, bank teller machines (ATMs) and vehicle navigation systems in accordance with their unique characteristics.

The display provides the image information required to the users. It is generally developed to have a wide viewing angle in order to allow the user to view images of the display regardless of the angular directions. However, depending on the purpose or configuration of the product to which the display device is applied, the wide viewing angle may adversely affect the characteristics of the product. In that case, the product may require a display having a narrow viewing angle.

For example, in the case of bank deposit/withdrawal device (i.e., ATM), it is more preferable that the ATM may be equipped with a display having a narrow viewing angle because it is required to prevent other people from recognizing personal information when any user inputs his personal information on the screen of the ATM. In the case of a vehicle navigation system, when the viewing angle of the display is wide, light may be reflected on the windshield of the vehicle during driving the vehicle, which may adversely affect the safety of the driver. In addition, in the case of a computer or a mobile phone, even though the user does not want to expose the privacy data, the wide viewing angle of the display is contrary to the user's request.

It is necessary to design and manufacture the display by adjusting the viewing angle according to the field to which the display is applied. However, when the wide viewing angle display and the narrow viewing angle are manufactured separately according to the requirements of the product, the productivity is poor. Therefore, after manufacturing a display having a wide viewing angle, a method for narrowing the viewing angle according to the field to which it is applied has been devised. In response to the needs of this situation, a light control film has been developed that can be attached to the display front surface of the display to narrow the viewing angle.

The light control film according to the conventional technology has a problem in that its precision is poor and the brightness of the display is degraded. In addition, under the condition in which external light reflection is severe, when the brightness of the display is dark, it may be difficult to accurately recognize image information of the display. Therefore, demands for a high-precision light control film having a new structure is increasing.

SUMMARY

The purpose of the present disclosure is to overcome the problems of the conventional art, to provide a light control film and a display having the same to control the viewing angle without lowering the brightness of the display. Another purpose of the present disclosure is to provide a light control film and display having the same that prevents reflection of light outside the display from the surface of the display and does not degrade the display quality.

In order to accomplish the above mentioned purposes of the present disclosure, a light control film according to the present disclosure includes a lower layer having a first axis and a second axis, a middle layer having a predetermined thickness disposed between the lower layer and the upper layer, and a plurality of nano light absorbing layers arrayed with a predetermined intercals along the first axis in the middle layer, each of the nano light absorbing layer having a width along the first axis, a length along the second axis and a height corresponding to the thickness of the middle layer, wherein ration between the interval and the width of the nano light absorbing layer is selected any one of 10:1 to 20:1.

In one example, the width of the nano light absorbing layer is selected any one in range of 0.1 μm to 1.0 μm.

In one example, the ratio between the interval and the height of the nano light absorbing layer is selected any one of 1:1 to 1:4.

In one example, each of the lower layer, the middle layer and the upper layer have refractive index higher than that of air, respectively.

In one example, each of the nano light absorbing layer has at least two thin layers stacked each other.

In one example, any one thin layer of the nano light absorbing layer has a film thickness selected one of 0.01 μm to 0.1 μm.

In one example, the nano light absorbing layer includes: a first thin layer having a first reflection ratio; and a second thin layer having a second reflection ratio different from the first reflection ratio.

In one example, the nano light absorbing layer further includes a third thin layer having a third reflection ratio different from the first and second reflection ratios.

In one example, the nano light absorbing layer includes: a first thin layer having a first transmittance ratio; and a second thin layer having a second transmittance ratio different from the first transmittance ratio.

In one example, the nano light absorbing layer further includes a third thin layer having a third transmittance ratio different from the first and second transmittance ratios.

In one example, the plurality of nano light absorubing layers includes a first nano light absorbing layer and a second nano light absorbing layer neighboring with the interval each other, and the middle layer includes a lower prism part and an upper prism part, the lower prism part positioned at a lower area based on a inclined surface connecting from an upper end of the first nano light absorbing layer to a lower end of the second nano light absorbing layer, and the upper prism part positioned at an upper area based on the inclined surface.

In one example, the lower prism part has a first refractive index, and the upper prism part has a second refractive index lower than the first refractive index.

In one example, the upper layer, the lower layer and the middle layer include a transparent organic material, and the nano light absorbing layer includes a material absorbing visible light having wavelength range of 400 nm to 800 nm.

In one example, the nano light absorbing layer includes at least selected one of silicon nitride (SiN), titanium nitride (TiN), silicon carbide (SiC), Tantalium (Ta), Titanium (Ti), Tungsten (W), Nickel (Ni), copper oxide (CuO), aluminum oxide (Al2O3), iron oxide (Fe3O4), nickel oxide (NiO) and tantalium oxide (Ta2O5).

In one example, the nano light absorbing layer has a refractive index lower than those of the upper layer, the lower layer and the middle layer.

In one example, the upper layer, the lower layer and the lower prism part have a first refractive index, the upper prism part has a second refractive index lower than the first refractive index, and the nano light absorbing layer has a third refractive index lower than the second refractive index.

In one example, the inclined surface of the middle layer is slanted as being crossing with a viewing angle direction having narrower than an opposite direction based on the slanted direction of the nano light absorbing layer.

Further, a display according to an example of the present disclosure includes a substrate having a plurality of pixels, an emission layer including a driving element and a light emitting element disposed at each of pixels, an encapsulation layer covering the emission layer; an optical layer on the encapsulation layer, a cover plate on the optical layer, and a light control film. The light control film includes a lower layer having a first axis and a second axis, a middle layer having a predetermined thickness disposed between the lower layer and the upper layer, and a plurality of nano light absorbing layers arrayed with a predetermined intercals along the first axis in the middle layer, each of the nano light absorbing layer having a width along the first axis, a length along the second axis and a height corresponding to the thickness of the middle layer, wherein ration between the interval and the width of the nano light absorbing layer is selected any one of 10:1 to 20:1.

The display apparatus according to the present disclosure may include a structure in which a plurality of light absorbing thin layers of nano-units scale are arranged at regular intervals, and the arrangement interval has at least 10 times the thickness of the light absorbing thin layer. Therefore, the light control film according to the present disclosure can secure an aperture ratio of 90% or more, and does not degrade the brightness of the display when applied to a display panel. In addition, one light absorbing thin layer of nano-units may have a plurality of thin layers having different refractive indices or different light absorption rates, so an excellent light absorption rate is ensured even though it has very thin thickness. Therefore, the light control film according to the present disclosure may have the excellent viewing angle control property. Further, due to the structure in which a plurality of nano scale light absorbing thin layers are continuously disposed, it has a function of polarization film for preventing external light reflection. That is, the present disclosure may provide a display panel with a thin thickness while having an anti reflection function without any additional optical film.

In addition to the effects of the present disclosure mentioned above, other features and advantages of the present disclosure may be described below, or may be clearly understood by those skilled persons in this art from such below descriptions and explanations.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
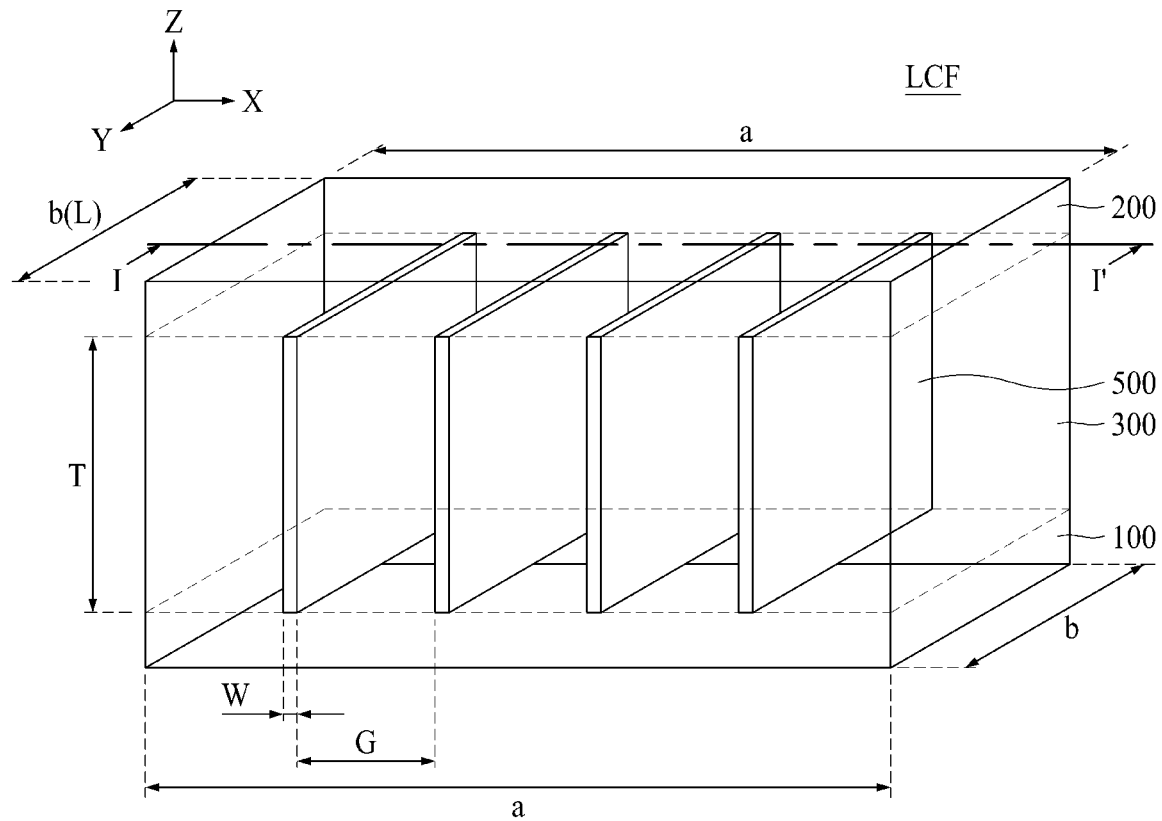
FIG. 1 is a perspective view illustrating a structure of the light control film having a nano light absorbing layer according to the first embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts. In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows. Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In the case that "comprise," "have," and "include" described in the present specification are used, another part may also be present unless "only" is used. The terms in a singular form may include plural forms unless noted to the contrary.

In construing an element, the element is construed as including an error range although there is no explicit description.

In describing a positional relationship, for example, when the positional order is described as "on," "above," "below," and "next," the case of no contact there-between may be included, unless "just" or "direct" is used. If it is mentioned that a first element is positioned "on" a second element, it does not mean that the first element is essentially positioned above the second element in the figure. The upper part and the lower part of an object concerned may be changed depending on the orientation of the object. Consequently, the case in which a first element is positioned "on" a second element includes the case in which the first element is positioned "below" the second element as well as the case in which the first element is positioned "above" the second element in the figure or in an actual configuration.

In describing a temporal relationship, for example, when the temporal order is described as "after," "subsequent," "next," and "before," a case which is not continuous may be included, unless "just" or "direct" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, terms such as the first, the second, A, B, (a) and (b) may be used. These terms are only to distinguish the elements from other elements, and the terms are not limited in nature, order, sequence or number of the elements. When an element is described as being "linked", "coupled" or "connected" to another element that element may be directly connected to or connected to that other element, but indirectly unless otherwise specified. It is to be understood that other elements may be "interposed" between each element that may be connected to or coupled to.

It should be understood that the term "at least one" includes all combinations related with any one item. For example, "at least one among a first element, a second element and a third element" may include all combinations of two or more elements selected from the first, second and third elements as well as each element of the first, second and third elements.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in a co-dependent relationship.

Hereinafter, an example of a display apparatus according to the present disclosure will be described in detail with reference to the accompanying drawings. In designating reference numerals to elements of each drawing, the same components may have the same reference numerals as much as possible even though they are shown in different drawings. Scale of the elements shown in the accompanying drawings have a different scale from the actual for convenience of description, it is not limited to the scale shown in the drawings.

First Embodiment

Figure 2:
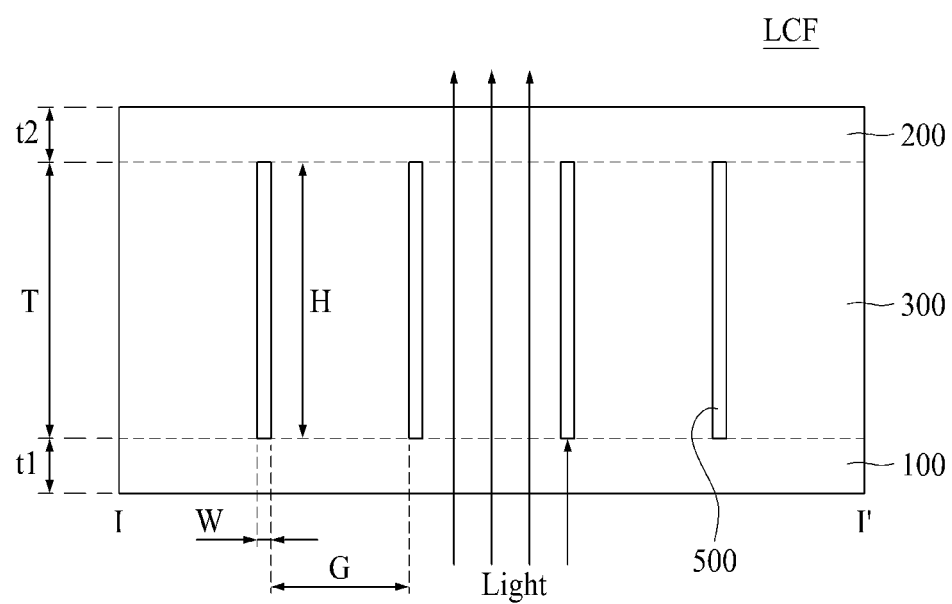
FIG. 2 is a cross-sectional view along cutting line I-I' in FIG. 1, for illustrating a structure of a light control film having a plurality of nano light absorbing layers according to the first embodiment of the present disclosure.

Hereinafter, referring to figures, we will explain about the light control film having nano light absorbing layers according to the first embodiment of the present disclosure. FIG. 1 is a perspective view illustrating a structure of the light control film having a nano light absorbing layer according to the first embodiment of the present disclosure. FIG. 2 is a cross-sectional view along cutting line I-I' in FIG. 1, for illustrating a structure of a light control film having a plurality of nano light absorbing layers according to the first embodiment of the present disclosure.

Referring to FIGS. 1 and 2, the light control film LCF according to the first embodiment of the present disclosure may comprise a lower layer 100, an upper layer 200, a middle layer 300, and a nano light absorbing layer 500. The lower layer 100 may be a thin plate or film having a first thickness t1. The upper layer 200 may be a thin plate or film having a second thickness t2 and the same shape with the lower layer 100. The first thickness t1 and the second thickness t2 may be same each other. The lower layer 100 and the upper layer 200 may be facing a certain distance or gap. The middle layer 300 is disposed or filled between the lower layer 100 and the upper layer 200.

The light control film LCF may be an optical film having the function to emit incident light only within a certain angular range. Therefore, the lower layer 100, the upper layer 200 and the middle layer 300 may include a transparent organic material. For example, they may include at least any one of acrylic resin material, polyvinyl chloride (PVC), polyethylene terephthalate (PET), polyacrylate, polyurethane, polycarbonate and polypropylene.

It is preferable that the nano light absorbing layer 500 may have the light absorbing property. Specifically, it is preferable that the nano light absorbing layer 500 may include a material absorbing visible light having wavelength range of 400 nm to 800 nm. For example, the nano light absorbing layer 500 may include an opaque material such as a metal material, a metal oxide material, a nitride material or carbon allotropy. In detail, the nano light absorbing layer 500 may include at least selected one of silicon nitride (SiN), titanium nitride (TiN), silicon carbide (SiC), Tantalium (Ta), Titanium (Ti), Tungsten (W), Nickel (Ni), copper oxide (CuO), aluminum oxide (Al2O3), iron oxide (Fe3O4), nickel oxide (NiO) and tantalium oxide (Ta2O5). Otherwise, the nano light absorbing layer 500 may include carbon allotropy such as graphene, carbon nano tube or fullerene (C60). The nano light absorbing layer 500 may be formed of organic material having excellent light absorbing property.

Referring to FIG. 1, the lower layer 100 may have a plate structure disposed on a plan including X axis and Y axis. The upper layer 200 may have the same shape with the lower layer 100 and be spaced apart from the lower layer 100 with a predetermined distance on Z axis. The middle layer 300 may be inserted between the lower layer 100 and the upper layer 200 and have a thickness T on the Z axis.

The nano light absorbing layer 500 may have a width W having a value in nano scale on the X axis, a length L along the Y axis, and a height H corresponding to the thickness T of the middle layer 300. A plurality of nano light absorbing layers 500 may be arranged at regular intervals G along the X axis in the middle layer 300. Especially, the ratio between the interval G of the nano light absorbing layers 500 and the width W of the nano light absorbing layer 500 may have any selected one from 10:1 to 20:1.

In detail, the lower layer 100 may have a thin plate structure with length of a, width of b and first thickness of t1, and the upper layer 200 may have a thin plate structure with length of a, width of b and second thickness of t2. The middle layer 300 may have a cubic structure disposed between the lower layer 100 and the upper layer 200. For example, the middle layer 300 may be a cuboid shape having length of a, width of b and thickness of T. The lower layer 100, the middle layer 300, and the upper layer 200 may be sequentially stacked from bottom to up.

The light control film LCF may have a louver structure in which a plurality of nano light absorbing layers 500 are arrayed with a constant interval G between the lower layer 100 and the upper layer 300. The nano light absorbing layer 500 may have a plurality of vertically plates arrayed with the constant interval G inside of the middle layer 300. For example, the nano light absorbing layer 500 may be a thin plate structure having a length L, a height H and a width W. The plurality of nano light absorbing layers 500 may be arrayed with the constant gap or interval G.

Here, the length L of the nano light absorbing layer 500 may be same as the width b of the lower layer. The height H of the nano light absorbing layer 500 may be same as the thickness T of the middle layer 300. It is preferable that the width W of the nano light absorbing layer 500 may have a nano-scale value.

For example, the width W of the nano light absorbing layer 500 may preferably have any one value in range of 0.1 μm to 1.0 μm. The arrangement interval G of the nano light absorbing layers 500 may preferably have any one value in range of 1.0 μm to 10.0 μm. Here, it is preferable that the ratio of the interval G versus the width W of the nano light absorbing layer 500 may have any one value in range of 10:1 to 20:1. As the result, the transmittance of light penetrating from the lower layer 100 to the upper layer 200 may be ensured at least 95%.

As shown in FIG. 2, when irradiating light in the normal direction from the surface of the lower layer 100, little portions of light are absorbed or blocked by the cross section area of the nano light absorbing layer 500. Most of light passing through the middle layer 300 are transmitted and then emitted out of the upper layer 200. According to the structure of the present disclosure, as the width W of the nano light absorbing layer 500 is 1.0 μm and the arrangement interval G is set to at least 10 times or more of the width W, the transmittance may be a very high value of 95% or more.

Figure 3A:
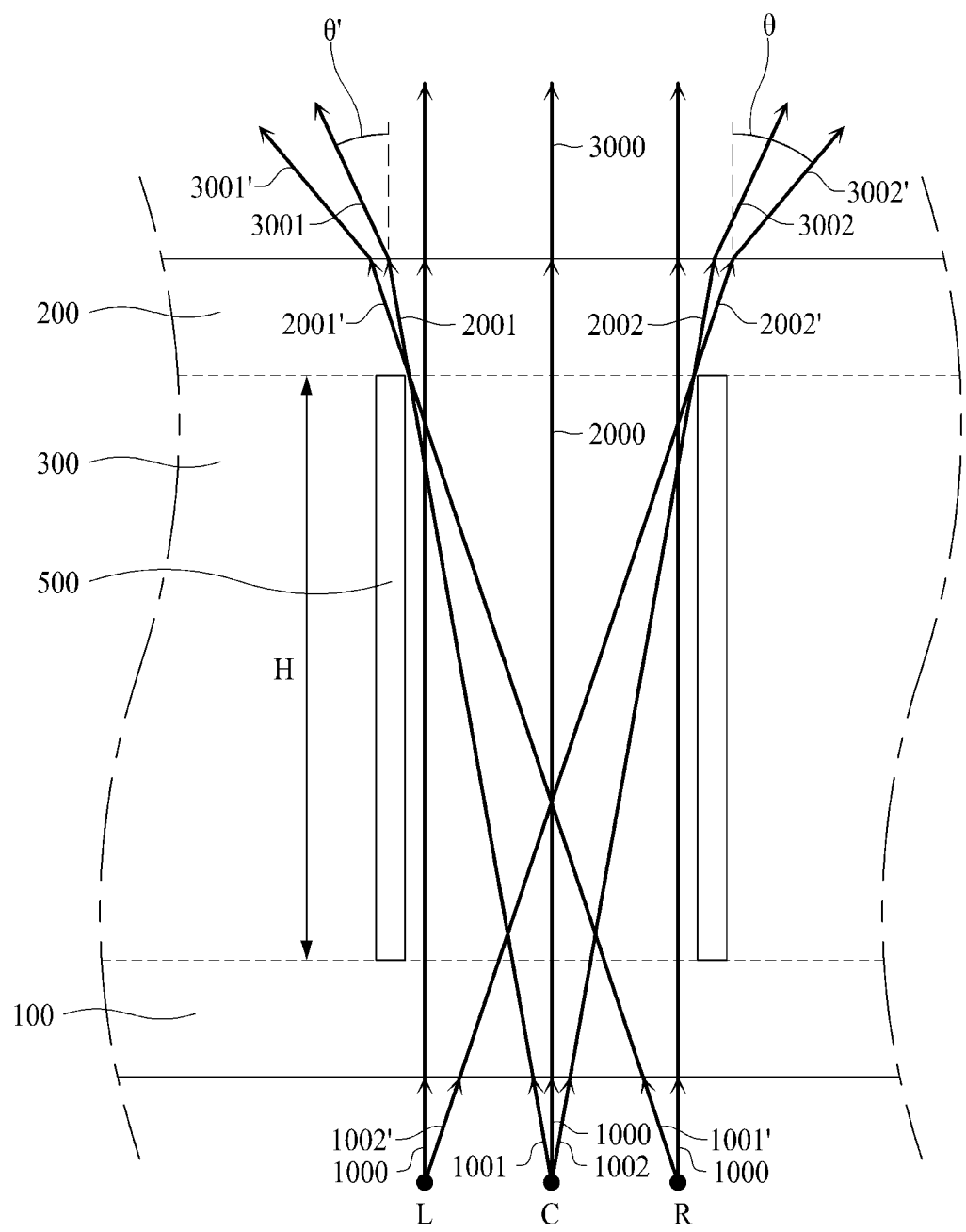
FIG. 3A is an enlarged cross-sectional view along cutting line I-I' in FIG. 1, for illustrating an arrangement structure of the nano light absorbing layers included into the light control film according to the first embodiment of the present disclosure.

Hereinafter, referring to FIG. 3A, the viewing angle controlling mechanism of the nano light absorbing layer 500 included in the light control film LCF according to the first embodiment of the present disclosure will be explained. FIG. 3A is an enlarged cross-sectional view along cutting line I-I' in FIG. 1, for illustrating an arrangement structure of the nano light absorbing layers included into the light control film according to the first embodiment of the present disclosure.

The light controlling performance of the light control film LCF according to the first embodiment of the present disclosure may be decided by the relationship between the arrangement interval G and the height H in the nano light absorbing layer 500. For example, the ratio between the arrangement interval G and the height H of the nano light absorbing layer 500 may be selected any one value in range of 1:1 to 1:4. Preferably, the ratio between interval G and height H may be selected any one value in range of 1:2 to 1:3.2. More preferably, the ratio between interval G and height H may be 1:2.6.

The arrangement pitch of the nano light absorbing layer 500 may be defined as the summation of width W and interval G of the nano light absorbing layer 500. In this application, the width W of the nano light absorbing layer 500 is very thin compared to the interval G. Therefore, the ratio between the interval G and the height H may be replaced with the ratio between the pitch and the height H.

Referring to FIG. 3A, the light is incident from the lower outside of the light control film LCF to the lower surface of the lower layer 100. In many cases, the light control film LCF according to the first embodiment of the present disclosure may be attached on the top surface of the display panel. As the lower layer 100 may have similar refractive index as the display panel, the incident light is not refracted but enters into the lower layer 100 as a straight line path.

When the lower layer 100, the middle layer 300, and the upper layer 200 may be made of the same material, there is no difference in refractive index, so that the transmitted light passing through the light control film LCF may be a straight line parallel to and extended from the incident light. The upper layer 200 may be the upper most layer in the display panel including the light control film LCF. In this case, the upper surface of the upper layer 200 may be contacted with air. When the refractive index of the upper layer 200 is greater than air, the emitted (or out-going) light may be refracted in a direction further away from the normal direction of the surface of the upper layer 200.

We will explain in detail referring to FIG. 3A. It can be considered that the light incident from the lower outside of the light control film LCF may be incident on 3 areas divided into a center area C, a left area L, and a right area R.

In the central area C, the incident light may be divided into a vertical incident light 1000 parallel to the normal direction of the surface of the light control film LCF, a left incident light 1001 slanted (or inclined) to left direction from the normal direction, and a right incident light 1002 slanted to right direction from the normal direction. The vertical incident light 1000 is incident into the lower layer 100 along the normal direction, and propagates to the vertical transmitted light 2000 passing through the lower layer 100, the middle layer 300, and the upper layer 200 sequentially. Then, the light is emitted as the vertical emission light 3000 out of the light control film LCF.

Some of the left incident light 1001 entering between upper end and lower end of the nano light absorbing layer 500 may be mostly absorbed by the nano light absorbing layer 500. The lights closer to normal direction than the light to the upper end of the nano light absorbing layer 500 may go forward as a left transmitted light 2001 passing the lower layer 100, the middle layer 300 and the upper layer 200. After passing the upper layer 200, the left transmitted light 2001 may go out of the light control film LCF as a left emission light 3001. As there is air layer on the outside of the light control film LCF, the left emission light 3001 may be refracted in a direction away from the normal direction. That is, the left emission light 3001 may have a refracted angle θ' between the normal direction and the emission direction.

With the same method, some of the right incident light 1002 entering between upper end and lower end of the nano light absorbing layer 500 may be mostly absorbed by the nano light absorbing layer 500. The lights closer to normal direction than the light to the upper end of the nano light absorbing layer 500 may go forward as a right transmitted light 2002 passing the lower layer 100, the middle layer 300 and the upper layer 200. After passing the upper layer 200, the right transmitted light 2002 may go out of the light control film LCF as a right emission light 3002. As there is air layer on the outside of the light control film LCF, the right emission light 3002 may be refracted in a direction away from the normal direction. That is, the right emission light 3002 may have a refracted angle θ' between the normal direction and the emission direction.

The light entering from the left area L may be divided into a vertical incident light 1000 parallel to the normal direction of the surface of the light control film LCF and a right incident light 1002' slanted to right direction from the normal direction. As the nano light absorbing layer 500 is closely disposed at the left side of the left area L, all of the light going to left side may be absorbed by the nano light absorbing layer 500, so left incident light is not considered in the left area L. The vertical incident light 1000 is incident into the lower layer 100 along the normal direction, and propagates to the vertical transmitted light 2000 passing through the lower layer 100, the middle layer 300 and the upper layer 200 sequentially. Then, the light is emitted as the vertical emission light 3000 out of the light control film LCF.

Some of the right incident light 1002' entering between upper end and lower end of the nano light absorbing layer 500 may be mostly absorbed by the nano light absorbing layer 500. The lights closer to normal direction than the light to the upper end of the nano light absorbing layer 500 may go forward as a right transmitted light 2002' passing the lower layer 100, the middle layer 300 and the upper layer 200. After passing the upper layer 200, the right transmitted light 2002' may go out of the light control film LCF as a right emission light 3002'. As there is air layer on the outside of the light control film LCF, the right emission light 3002' may be refracted in a direction away from the normal direction. That is, the right emission light 3002' may have a refracted angle θ between the normal direction and the emission direction.

The light entering from the right area R may be divided into a vertical incident light 1000 parallel to the normal direction of the surface of the light control film LCF and a left incident light 1001' slanted to right direction from the normal direction. As the nano light absorbing layer 500 is closely disposed at the right side of the right area R, all of the light going to right side may be absorbed by the nano light absorbing layer 500, so right incident light is not considered in the right area R. The vertical incident light 1000 is incident into the lower layer 100 along the normal direction, and propagates to the vertical transmitted light 2000 passing through the lower layer 100, the middle layer 300 and the upper layer 200 sequentially. Then, the light is emitted as the vertical emission light 3000 out of the light control film LCF.

Some of the left incident light 1001' entering between upper end and lower end of the nano light absorbing layer 500 may be mostly absorbed by the nano light absorbing layer 500. The lights closer to normal direction than the light to the upper end of the nano light absorbing layer 500 may go forward as a left transmitted light 2001' passing the lower layer 100, the middle layer 300 and the upper layer 200. After passing the upper layer 200, the left transmitted light 2001' may go out of the light control film LCF as a left emission light 3001'. As there is air layer on the outside of the light control film LCF, the left emission light 3001' may be refracted in a direction away from the normal direction. That is, the left emission light 3001' may have a refracted angle θ' between the normal direction and the emission direction.

As a result, the viewing angle θ' may be determined by the refracted angle θ', the angle of emission light, that determines a transmitting direction of light transmitted and through out of the light control film LCF according to the first embodiment of the present disclosure.

In one example, when ratio between the arrangement interval G and height H of the nano light absorbing layer 500 has 1:1 in the light control film, the viewing angle may be 45°±5° in one direction based on the vertical surface of the nano light absorbing layer 500. Considering the trigonometric function, it may be calculated that the viewing angle is 45° in one direction from the normal direction. When light passes through the light control film LCF and is emitted into the air, in the case that the refractive index of the light control film LCF has a value higher than that of the air, the viewing angle may become larger by the difference in the refractive index. Therefore, the viewing angle may be any one of 45°±5° depending on the refractive index of the light control film LCF. Here, for convenience, the thickness of the lower layer 100 and the upper layer 200 is much thinner than that of the middle layer 300, so the difference in the optical path due to the thickness of the lower layer 100 and the upper layer 200 may be not considered.

In another case that the ratio between the arrangement interval G and the height H of the nano light absorbing layer 500 is 1:2, the viewing angle may be 63.4°±5° in one direction based on the nano light absorbing layer 500. For still another case that the ratio between the interval G and the height H of the nano light absorbing layer 500 is 1:3, the viewing angle may be 71.5°±5° in one direction based on the nano light absorbing layer 500.

For the case that the ratio between the interval G and the height H of the nano light absorbing layer 500 is 1:4, the viewing angle may be 76°±5° in one direction based on the nano light absorbing layer 500. Consequently, the larger the height H compared to the interval G, the narrower the viewing angle. By selecting the ratio between the interval G and the height H of the nano light absorbing layer 500, it is possible to provide a viewing angle suitable for the requirement of the display.

For the most preferable example in the first embodiment of the present disclosure, the ratio between the interval G and the height H may be 1:2.6. In this case, the viewing angle may be 68.9°±5° in one direction based on the nano light absorbing layer 500. Applying this viewing angle to a vehicle navigation system or head up display (HID), a product ensuring the safest driving environment for the driver can be produced.

Figure 4A:
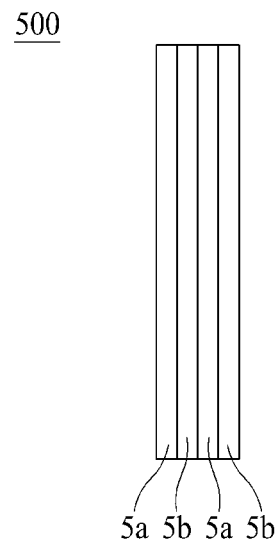
FIGS. 4A and 4B are enlarged cross-sectional views illustrating structures of a nano light absorbing layer included into the light control film according to the first embodiment of the present disclosure.
Figure 4B:
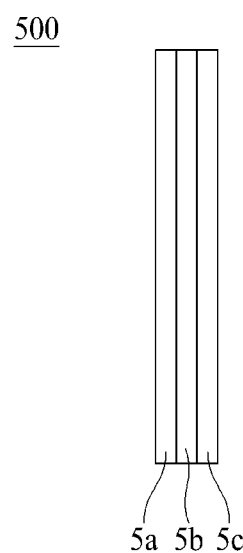

Hereinafter, referring to FIGS. 4A and 4B, we will explain about more detailed structure of the nano light absorbing layer included in the light control film LCF according to the first embodiment of the present disclosure. FIGS. 4A and 4B are enlarged cross-sectional views illustrating structures of a nano light absorbing layer included into the light control film according to the first embodiment of the present disclosure.

Referring to FIGS. 4A and 4B, the nano light absorbing layer 500 included in the light control film LCF according to the first embodiment of the present disclosure may have a stacked structure in which at least two thin layers are stacked. For example, the nano light absorbing layer 500 may have a first thin layer and a second thin layer made of different materials each other. Otherwise, a first thin layer, a second thin layer and a third thin layer made of different materials may be sequentially stacked. Further, different n thin layers may be sequentially stacked.

One of a plurality of thin layers including the nano light absorbing layer 500 may have any one width in range of 0.01 μm to 0.1 μm. One of the nano light absorbing layers 500 in which thin film layers having the nano scale width are stacked may have a width of less than 1.0 μm. Here, the 'width' of the nano light absorbing layer 500 is named in consideration of the direction on the drawing, and may be referred to as 'thickness' in another expression.

As the width of the nano light absorbing layer 500 is very thin in nano scale, the absorption rate indicating a performance of blocking light incident on the side surface may be low. In order to ensure the light blocking performance of the nano light absorbing layer 500, it is preferable to use a material having a high absorption rate.

Considering productivity and material cost, a metal material, a metal oxide material or a nitride material having different reflectances may be alternately stacked to form a nano metal (i.e., nano light absorbing layer) 500 having an enhanced light absorption rate. For example, in the case that the nano light absorbing layer 500 is formed of a plurality of thin layers, one thin layer may be selected any one of silicon nitride (SiN), titanium nitride (TiN), silicon carbide (SiC), Tantalum (Ta), Titanium (Ti), Tungsten (W), Nickel (Ni), copper oxide (CuO), aluminum oxide (Al2O3), iron oxide (Fe3O4), nickel oxide (NiO) and tantalium oxide (Ta2O5).

In one embodiment, the nano light absorbing layer 500 may be formed in a multilayer structure using nickel which is a metal material. The nano light absorbing layer 500 may be formed by sequentially stacking a first nickel metal layer, the nickel oxide layer and a second nickel metal layer.

In another embodiment, the nano light absorbing layer 500 may include a non-metallic material such as a carbon allotrope. The carbon allotropes are made of carbon, but they have different properties from carbon due to different arrangement of atoms. The carbon allotropes may include fullerene, graphene or carbon nano tube. In one example, fullerenes may include C60 fullerenes having fullerene molecules composed of 60 carbon atoms, C70 fullerenes having fullerene molecules composed of 70 carbon atoms, or C76 fullerenes having fullerene molecules composed of 76 carbon atoms.

There are optical properties of a material such as reflection, transmission and absorption. When lights enter into a certain material layer, as shown in Equation 1 below, some lights are reflected, some are absorbed and others are transmitted.

Incident light (*I*)=Reflection rate (*R*)+Absorption rate (*A*)+Transmittance rate (*T*)=100%  [Equation 1]

As mentioned above, it is most preferable to use a material having a high absorption rate, for manufacturing the excellent nano light absorbing layer using.

In the case of metallic materials, the reflectance of light may be 90% or more. When lights enter into the metal layer, electrons are excited above the Fermi level as absorbing the energy of light, and then immediately emit photons. The light absorption and the photon (i.e., energy) emission are almost simultaneously occurred, so that it is recognized as the light is reflected. The remaining 10% may be absorbed or permeated (or transmitted) into the metal layer.

The light absorption and the photon emission are usually performed within 0.1 μm. Therefore, in the case of metal layer having a thickness of tens of nm, most of the lights may be not reflected but transmitted. That is, as irradiating lights to the nano metal layer, the transmittance rate may have the highest rate value. For example, lights are irradiated to a metal layer having tens of nm thickness, the transmittance rate may be 80%, the reflection rate may be 10% and the absorption rate may be 10%.

As different metal materials having different reflection rate are stacked in a nano-scale multi-layer, a large amount of transmitted light can repeat the reflection and reverse-reflection (i.e., resonating) at the interface of the layers in the multi-layer structure. As a result, the lights may be trapped inside the nano-scale multi-layer, and may be absorbed as thermal energy while resonating, so that the absorption rate may be increased. This mechanism can also occur in the inorganic thin multi-layer structure in addition to the metallic thin multi-layer. Further, such mechanism may be expected in a specific organic material thin multi-layer. For the case of organic material, a nano light absorbing layer having a high absorption rate may be formed by stacking a plurality of organic layers having a high absorption rate.

In detail, as shown in FIG. 4A, the nano light absorbing layer 500 may be formed by alternately stacking a first thin layer 5*a* having a first reflection rate and a second thin layer 5*b* having a second reflection rate. In another example, as shown in FIG. 4B, the nano light absorbing layer 500 may be formed by sequentially stacking a first thin layer 5*a* having a first reflection rate, a second thin layer 5*b* having a second reflection rate, and a third thin layer 5*c* having a third reflection rate. For other example, the nano light absorbing layer 500 may be formed by sequentially stacking n thin layers having different reflection rates each other.

In FIGS. 4A and 4B, the first to third thin layers 5*a* to 5*c* have different reflection rates, but, as shown in Equation 1, the nano light absorbing layer may be formed as considering the absorption rate or the transmittance rate depending on the optical properties of the material used. For example, the nano light absorbing layer 500 may be formed by stacking thin layers having different transmittance rate or different absorption rate.

Figure 3B:
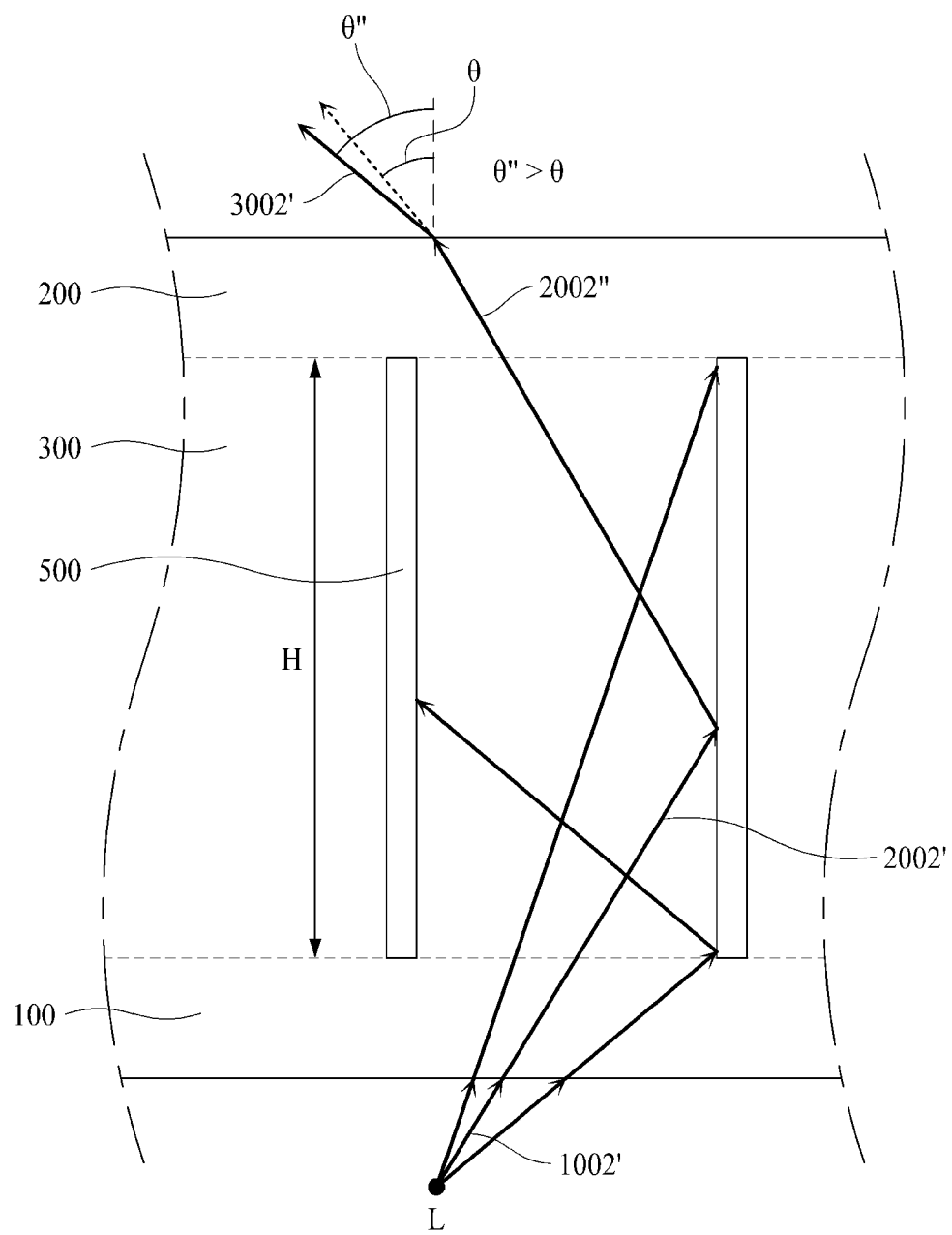
FIG. 3B is a simplified drawing for explaining the light paths of leaked lights absorbed by the nano light absorbing layer in the light control film according to the first embodiment of the present disclosure.

As described above, by adjusting the structure and optical properties of the nano layers included in the nano light absorbing layer 500, the light absorption rate of the nano light absorbing layer 500 may be ensured to 90% or more, so that the reflection rate can be set to less than 10%. As shown in FIG. 3B, only 10% or less of the lights incident into the nano light absorbing layer 500 may be reflected.

As shown in the light path of FIG. 3B, the reflected light may have an emission angle θ" larger than the viewing angle θ. However, the reflected light is less than 10% of the incident lights, so that the amount of leakage light beyond the viewing angle θ can be reduced. FIG. 3B is a simplified drawing for explaining the light paths of leaked lights absorbed by the nano light absorbing layer in the light control film according to the first embodiment of the present disclosure.

Referring to FIG. 3B, when the lights incident into the nano light absorbing layer 500 from the bottom of the light control film LCF on one side are reflected, most of the reflected lights may be emitted out from the upper end of the nano light absorbing layer 500 on the opposite side. These lights may have an emission angel θ" larger than the viewing angle θ. However, the nano light absorbing layer 500 provided in the light control film LCF according to the present disclosure may reduce the amount of reflected lights as the light absorption rate is adjusted to 90% or more.

For an example, we will explain about the light path of the right incident light 1002' incident into the nano light absorbing layer 500 disposed at left side, for the lights from the left area L to the lower layer 100. The right incident light 1002' may reach to the nano light absorbing layer 500 as the right transmitted light 2002' passing through the lower layer 100 and the middle layer 300. After reflected by the nano light absorbing layer 500, the light may be the left reflected light 2002" passing through the middle layer 300 and the upper layer 200. After that, the light may be the left emission light 3002' to be radiated out of the light control film LCF. As the upper layer 200 contacts the air layer having relatively low refractive index than the upper layer 200, the left emission light 3002' may be refracted as being further away from the normal direction. That is, the left emission light 3002' may have a reflective viewing angle θ" which is much larger than the viewing angle θ explained in FIG. 3A. Here, the dotted arrow line refers to the left emission light 3001' explained in FIG. 3A which determines the left viewing angle θ.

Therefore, some of the lights may be irradiated out of the viewing angle θ which is determined by the design of the light control film LCF. As the light absorbing rate of the nano light absorbing layer 500 is adjusted to 90% or more, the amount of the leaked light out of the viewing angle θ may be controlled in extremely small amount. In addition, for certain display devices, even such a small amount of lights may cause inconvenience to the user. Hereinafter, we will explain about the structural features capable of further reducing or completely removing lights leaking outside the viewing angle narrowly set.

Second Embodiment

Figure 5A:
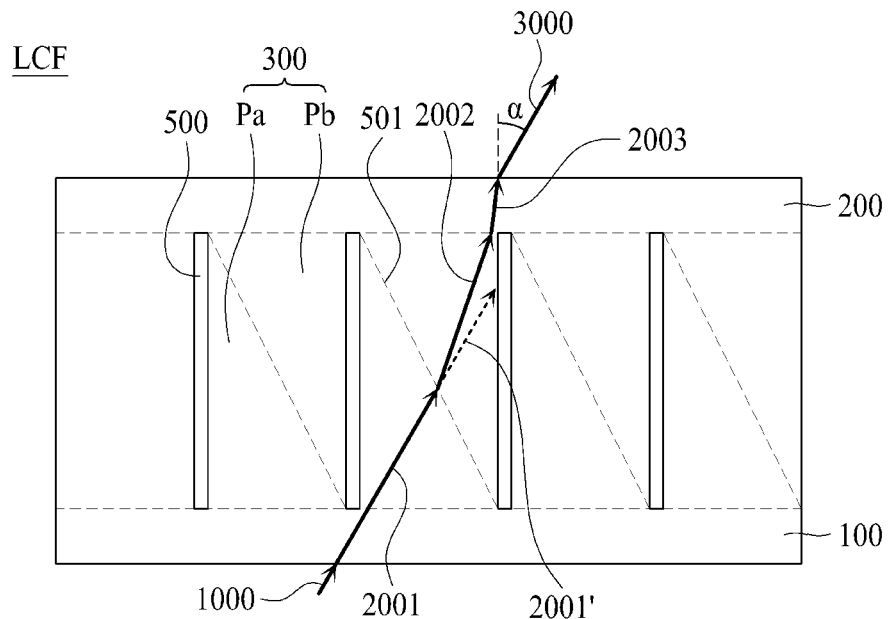
FIG. 5A is a cross-sectional view illustrating a structure of a light control film according to the second embodiment of the present disclosure.
Figure 5B:
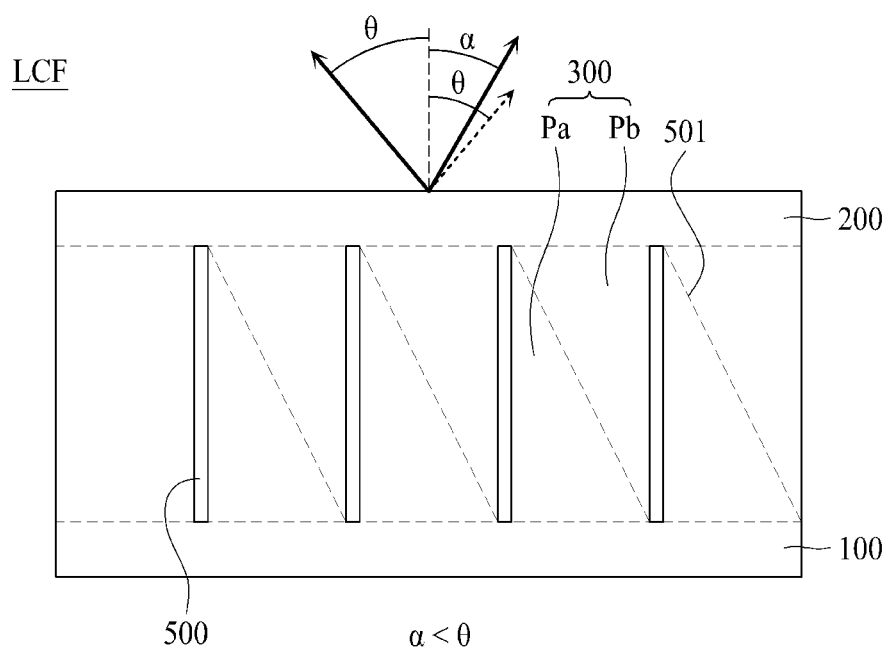
FIG. 5B is a cross-sectional view illustrating a viewing angle range set by the light control film according to the second embodiment of the present disclosure.

Hereinafter, referring to FIGS. 5A and 5B, the second embodiment of the present disclosure will be explained. FIG. 5A is a cross-sectional view illustrating a structure of a light control film according to the second embodiment of the present disclosure. FIG. 5B is a cross-sectional view illustrating a viewing angle range set by the light control film according to the second embodiment of the present disclosure. The light control film LCF according to FIG. 5A may have a similar structure of the light control film LCF according to FIG. 2. The differences are that the middle layer 300 includes the lower prism part Pa and the upper prism part Pb. The lower prism part Pa is disposed below the hypotenuse 501 (or an inclined surface) connecting the diagonal points of the neighboring two nano light absorbing layers 500. The upper prism part Pb is disposed above the hypotenuse 501.

The lower prism part Pa may include the same material of the lower layer 100 and the upper layer 200, for example, a transparent organic material. In this case, the lower prism part Pa may have the same refractive index as the lower layer 100 and the upper layer 200.

On the other hand, the upper prism part Pb may include a transparent organic material different from the lower prism part Pa. In this case, the upper prism part Pb may have a lower refractive index than the lower layer 100 and the upper layer 200. In one example, the refractive index of the upper prism part Pb may have a value lower 0.05 to 0.1 than that of the lower prism part Pa. In detail, the upper prism portion Pb may have a refractive index of 1.40, and the lower prism part Pa may have a refractive index of 1.45. For another example, the upper prism portion Pb may have a refractive index of 1.40, and the lower prism part Pa may have a refractive index of 1.50.

With such a structure, when the light incident from the lower layer 100 passes through the middle layer 300 and the upper layer 200 and then emits to the outside, the light may have a different light path from the light path shown in FIG. 2. Referring to FIG. 5A, light may be incident to the bottom surface of the lower layer 100 from the outside of the light control film LCF according to the second embodiment of the present disclosure. The light control film LCF according to the second embodiment may be attached on the topmost surface of the display panel. The display panel attached to the lower layer 100 may have a refractive index very similar with that of the lower layer 100, so the incident light 1000 is illustrated as a straight line not to be refracted, in convenience. In the second embodiment, as the hypotenuse 501 which is the boundary between the lower prism part Pa and the upper prism part Pb is inclined from the upper left to the lower right, the light incident toward the hypotenuse 501 may be mainly affected by the difference of refractive index. Therefore, in the second embodiment, the right incident light will be mainly described.

In the case that the lower layer 100 and the lower prism part Pa of the middle layer 300 are made of the same material, since there is no difference in refractive index, the first transmitted light 2001 traveling up to the hypotenuse 501 may have a light path that extends in a straight line as parallel with the incident light 1000. In the case that the lower prism part Pa and the upper prism part Pb are made of different materials, in particular the refractive index of the upper prism Pb is smaller than the lower prism part Pa, the second transmitted light 2002 is refracted in a direction further away from the normal direction of the hypotenuse 501. The upper layer 200 may be in contact with the top surface of the upper prism part Pb. In the case that the upper layer 200 has the same refractive index as the lower layer 100, the light passes through from the low refractive medium to the high refractive medium at the boundary between the upper prism part Pb and the upper layer 200. The third refracted light 2003 may be refracted closer to the normal direction. That is, during passing through from the lower prism part Pa via the upper prism part Pb to the upper layer 200, the light path may be further refracted in the normal direction of the surface of the light control film LCF.

In the case that the middle layer 300 may be not divided into the upper prism part Pb and the lower prism part Pa, the transmitted light 2001 may follows the path illustrated by the dotted arrow line 2001', so the transmitted light 2001 may be absorbed by the nano light absorbing layer 500 and then disappeared. However, in the case that the upper prism Pb has lower refractive index than the lower prism part Pa, the transmitted light may be refracted by the hypotenuse 501 and may be go out from the light control film LCF. As a result, the amount of light may increase in the front direction, and it is possible to improve the light output efficiency.

The light passing through the upper layer 200 may be emitted from the light control film LCF as the emission light 3000. The upper layer 200 may be the outmost layer in the display panel including the light control film LCF. In that case, the top surface of the upper layer 200 may be in contact with the air layer. In the case that the refractive index of the upper layer 200 is larger than the air, the emission light 3000 may be refracted in a direction further away from the normal direction of the surface of the upper layer 200. Here, the refractive angle of the emission light 3000 may be determined as the second viewing angle α.

Among the incident lights 1000, the light having a wider angle than the diagonal extending direction between the neighboring two nano light absorbing layers 500 may be blocked or absorbed by the nano light absorbing layer 500. Therefore, the second viewing angle α may be determined by the proceeding direction of the transmitted lights not blocked by the light control film LCF.

When compared with the first embodiment, the second viewing angle α according to the second embodiment may be smaller than the first viewing angle θ. In particular, in the second embodiment, as the hypotenuse 501 is inclined from the upper left corner to the lower right corner, it may have a structure that can mainly affect the light incident from the left area L. Therefore, the viewing angle may have a non-symmetric viewing angle range based on the normal direction of the light control film LCF.

For example, as shown in FIG. 5B, the right viewing angle may have a smaller value than the left viewing angle. In detail, the left viewing angle may have a first viewing angle θ, while the right viewing angle may have a second viewing angle α. This structure may be applied to displays that need to provide a narrower viewing angle in the right direction on the front side of the display.

In another example, although not shown in figures, the refractive index of the upper prism part Pb may have a value greater than the refractive index of the lower prism part Pa. In that case, contrary to the case of FIG. 5A, it may be refracted in a direction closer to the normal of the hypotenuse 501. As the result, the second viewing angle α may be larger than the first viewing angle θ.

When compared with the first embodiment, the second viewing angle α may be larger than the first viewing angle θ. That is, the left viewing angle may have the first viewing angle θ, while the right viewing angle may have a second viewing angle α greater than the first viewing angle θ. This structure may be applied to displays that need to provide a wider viewing angle in the right direction on the front side of the display.

Third Embodiment

Figure 6:
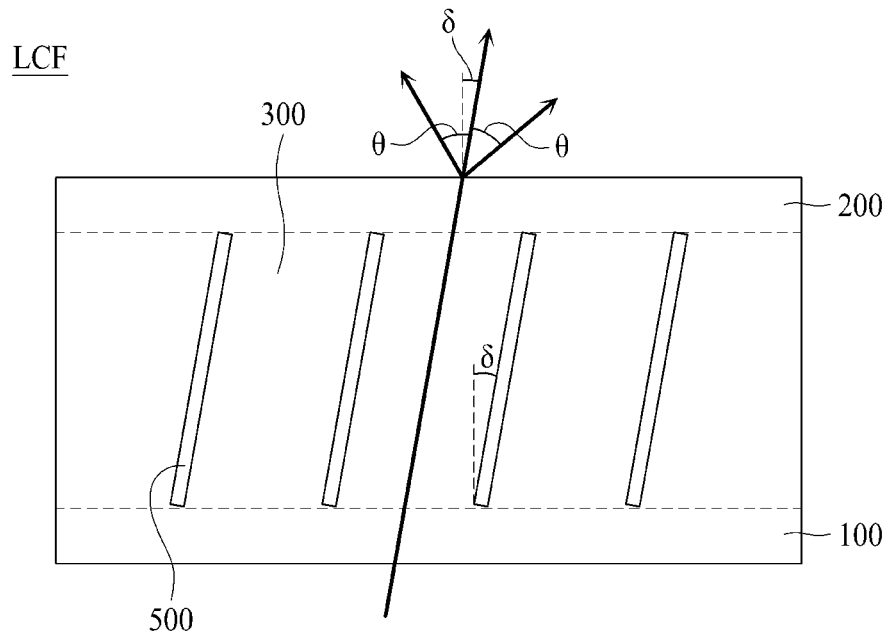
FIG. 6 is a cross sectional view illustrating a structure of the light control film according to the third embodiment of the present disclosure.

In the light control film LCF according to the first and second embodiments of the present disclosure, the emission direction of the lights is aligned to the normal direction of the surface of the light control film LCF. In the third embodiment of the present disclosure, the light control film LCF may be configured that the incident light may be emitted in a direction inclined at a predetermined angle to one side with respect to the normal direction of the surface of the light control film LCF. Hereinafter, referring to FIG. 6, we will explain about the third embodiment of the present disclosure. FIG. 6 is a cross sectional view illustrating a structure of the light control film according to the third embodiment of the present disclosure.

Referring to FIG. 6, the light control film LCF according to the third embodiment may be similar with the second embodiment shown in FIG. 5A. The difference is that the light absorbing layer 500 is slanted at an angle with respect to the vertical line (or normal direction). For example, the light absorbing layer 500 may be disposed to be slanted δ° to the right direction based on the vertical direction. In this case, the light emitted from the light control film LCF may be emitted in a direction inclined by δ° to the right direction with respect to the normal of the light control film LCF.

According to the third embodiment of the present disclosure, the light control film LCF may provide the emission light in a specific direction inclined from the front normal direction of the light control film LCF without tilting the display panel in the specific direction. In addition, as described in FIG. 3A, the light absorbing layer 500 according to the third embodiment of the present disclosure may provide only a specific range of viewing angle. As shown in FIG. 6, the light control film LCF according to the third embodiment of the present disclosure may provide the emission light in a direction inclined δ° to one side direction with respect to the normal direction, and may control the emission viewing angle in a range within ±θ° based on direction of δ°.

Fourth Embodiment

Figure 7:
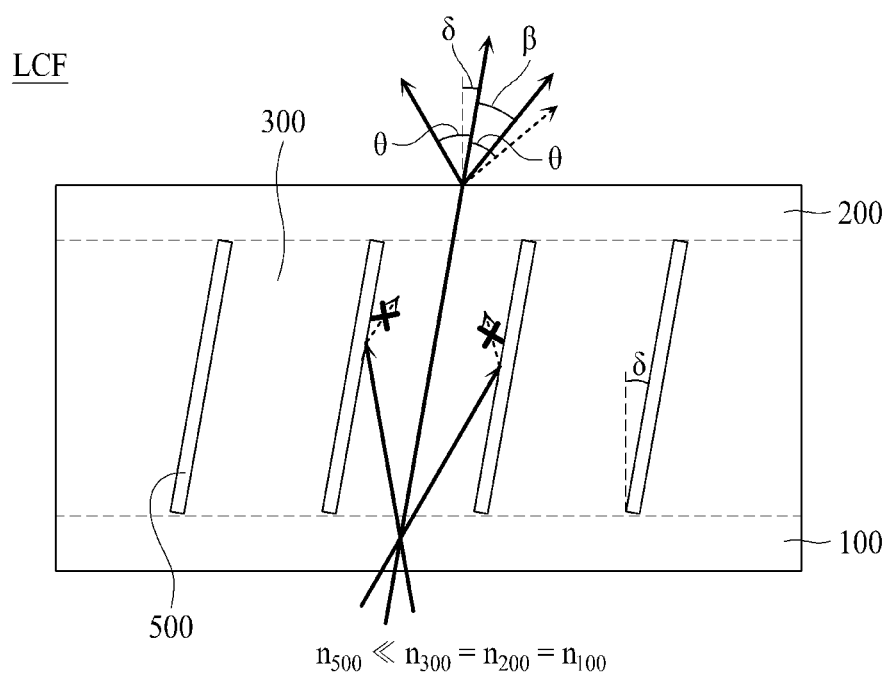
FIG. 7 is a cross sectional view illustrating a structure of the light control film according to the fourth embodiment of the present disclosure.

Hereinafter, referring to FIG. 7, we will explain about the fourth embodiment of the present disclosure. FIG. 7 is a cross sectional view illustrating a structure of the light control film according to the fourth embodiment of the present disclosure.

Referring to FIG. 7, the light control film LCF according to the fourth embodiment may be similar with the third embodiment shown in FIG. 6. The difference is that the refractive index of the nano light absorbing layer 500 is smaller than that of the middle layer 300. The refractive index of the nano light absorbing layer 500 may be about 0.05 to 0.15 smaller than the refractive index of the middle layer 300. For example, the refractive index of the middle layer 300 is 1.60, and the refractive index of the nano light absorbing layer 500 may be 1.50. For another example, the refractive index of the middle layer 300 is 1.53, and the refractive index of the nano light absorbing layer 500 may be 1.45. Further, the refractive index of the middle layer 300 may have the same refractive index as the lower layer 100 and the upper layer 200.

As the refractive index of the nano light absorbing layer 500 is lower than that of the middle layer 300, most of the light passing through the lower layer 100 and the middle layer 300 is not reflected by the nano light absorbing layer 500, but refracted or absorbed into the nano light absorbing layer 500. In other words, in the case of light incident from the high-refractive medium to the low-refractive medium, the total reflection critical angle is larger than the reversed case, so that the amount of the reflected lights is decreased and the amount of the refracted lights is increased. A large amount of lights that may have been reflected by the nano light absorbing layer 500 when the refractive index of the nano light absorbing layer 500 is lower than the refractive index of the middle layer 300, may be refracted into and absorbed by the nano light absorbing layer 500.

For example, as shown in FIG. 7, the light irradiated from the right area to the nano light absorbing layer 500 disposed at the left side may not be reflected by the nano light absorbing layer 500, but be absorbed into the nano light absorbing layer 500. As the result, the viewing angle in the right direction may be β smaller than θ.

On the contrary, most of the lights irradiated from the left area to the nano light absorbing layer 500 disposed at the right side may be reflected by total reflection and then may be emitted in the left direction. Since the nano light absorbing layer 500 is inclined to the right side, even though the refractive index of the nano light absorbing layer 500 has a lower value than the middle layer 300, the incident angle of light entering into the nano light absorbing layer 500 from the left area may be greater than the total reflection critical angle. As the result, the viewing angle in the left direction may be substantially equal to θ.

As the basic configuration of the fourth embodiment is similar with the third embodiment, the light control film LCF according to the fourth embodiment may have the nano light absorbing layer 500 inclined at an angle to the vertical line which is parallel to the normal direction of the surface. For example, the nano light absorbing layer 500 may be disposed as being inclined with an angle of δ° to the right side with respect to the vertical direction. In this case, the light emitted from the light control film LCF may be emitted in a direction inclined by δ° to the right direction with respect to the normal of the light control film LCF.

Due to the configuration of the light absorbing layer 500 as explained in FIG. 3A, the light control film LCF according to the fourth embodiment may provide the emission lights within a specific range of viewing angle. In addition, the light control film LCF according to the fourth embodiment may provide the emission light having an asymmetric viewing angle with respect to the inclined emission direction of the light. In detail, as shown in FIG. 7, the light control film LCF according of the fourth embodiment may provide the emission lights in a direction inclined δ° to the right direction with respect to the normal direction of the light control film LCF, while the viewing area may be controlled to be within a range of θ° in the left direction and β° (<θ°) in the right direction based on direction of δ°.

Fifth Embodiment

Figure 8:
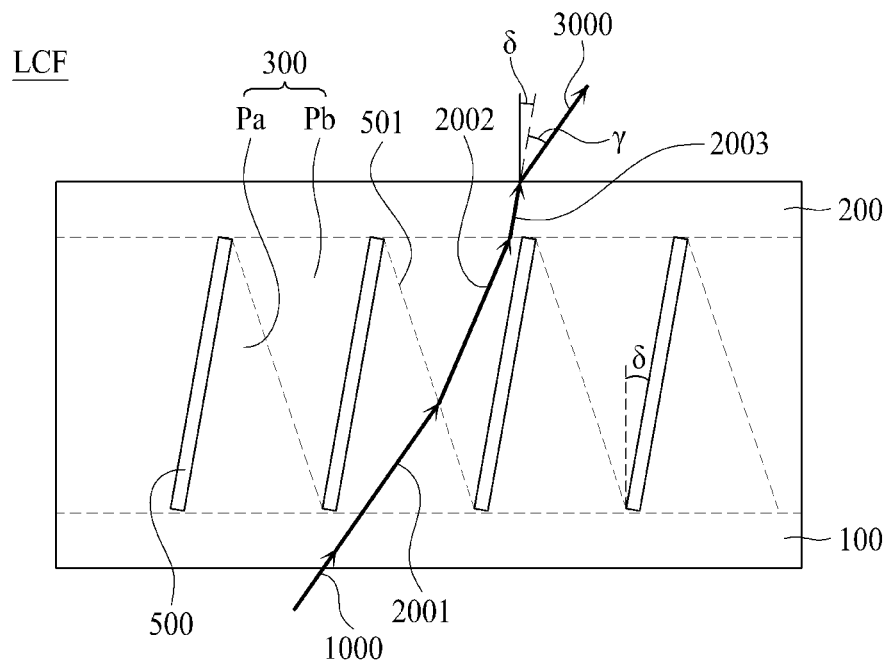
FIG. 8 is a cross sectional view illustrating a structure of the light control film according to the fifth embodiment of the present disclosure.

Hereinafter, referring to FIG. 8, we will explain about the fifth embodiment of the present disclosure. FIG. 8 is a cross sectional view illustrating a structure of the light control film according to the fifth embodiment of the present disclosure.

The light control film LCF according to FIG. 8 may have very similar structure with the light control film LCF according to FIG. 7. The difference is that the middle layer 300 includes the lower prism part Pa and the upper prism part Pb. The lower prism part Pa is disposed below the hypotenuse 501 (or an inclined surface) connecting the diagonal points of the neighboring two nano light absorbing layers 500. The upper prism part Pb is disposed above the hypotenuse 501. Here, the lower prism part Pa and the upper prism part Pb may be the same or similar as those described in the second embodiment.

The upper prism part Pb may have a lower refractive index than the lower layer 100 and the upper layer 200. In one example, the refractive index of the upper prism part Pb may have a value lower 0.05 to 0.1 than that of the lower prism part Pa. At the same time, the refractive index of the nano light absorbing layer 500 is smaller than that of the middle layer 300. For example, the refractive index of the nano light absorbing layer 500 may be about 0.05 to 0.15 smaller than the refractive index of the middle layer 300.

As shown in FIG. 8, the refractive index moo of the lower layer 100, the refractive index $n_{200}$ of the upper layer 200 and the refractive index $n_{Pa}$ of the lower prism part Pa may be the same each other. The refractive index nPb of the upper prism part Pb may be lower than the refractive index $n_{Pa}$ of the lower prism part Pa. Further, the refractive index $n_{500}$ of the nano light absorbing layer 500 may be lower than the refractive index $n_{Pb}$ of the upper prism part Pb. In this case, the refractive index $n_{500}$ of the nano light absorbing layer 500 is lower than the refractive index $n_{Pa}$ of the lower prism part Pa.

In detail, the lower prism part Pa may have the refractive index of 1.53, and the upper prism part Pb may have the refractive index of 1.48. In this case, the nano light absorbing layer 500 may have the refractive index of 1.41. When the nano light absorbing layer 500 is selected as including a metal material, it might be difficult to select the metal material which has the refractive index of 1.5 or lower. On the contrary, as for selecting the material of the middle layer 300, it is easy to select the organic material which has relatively higher refractive index than 1.50. Considering these conditions, the nano light absorbing layer 500 may have the refractive index of 1.50, the lower prism part Pa may have the refractive index of 1.62, and the upper prism part Pb may have the refractive index of 1.55.

With these refractive indices, as mentioned in the second embodiment, the right incident light, as passing through the lower layer 100, the middle layer 300 and the upper layer 200, may be refracted so as to be closer to the normal direction of the surface of the light control film LCF. Thereafter, being emitted to the outside of the light control film LCF, it may go out as the emission light 3000 having a refractive angle of (δ+γ)° with respect to the normal direction.

Here, the inclined direction of the hypotenuse 501 dividing the lower prism part Pa and the upper prism part Pb may be set to the direction crossing with the viewing angle direction having narrower viewing angle range. For example, as shown in FIG. 8, the nano light absorbing layer 500 is inclined in right direction from the vertical direction. Further, the viewing angle range of the right direction is set to be narrower than the viewing angle range of the left direction based on the slanted direction of the nano light absorbing layer 500. In this case, the hypotenuse 501 which is the bordering surface between the upper prism part Pa and the lower prism part Pb disposed in the middle layer 300 of the light absorbing layer LCF, may have the inclined direction from left upper end to right lower end. Therefore, the inclined direction of the inclined surface (501) of the middle layer (300) is slanted as being crossing with the right viewing angle direction based on the slanted direction of the nano light absorbing layer, wherein the right viewing angle direction has a narrower viewing angle range than that of the left viewing angle direction.

Figure 9:
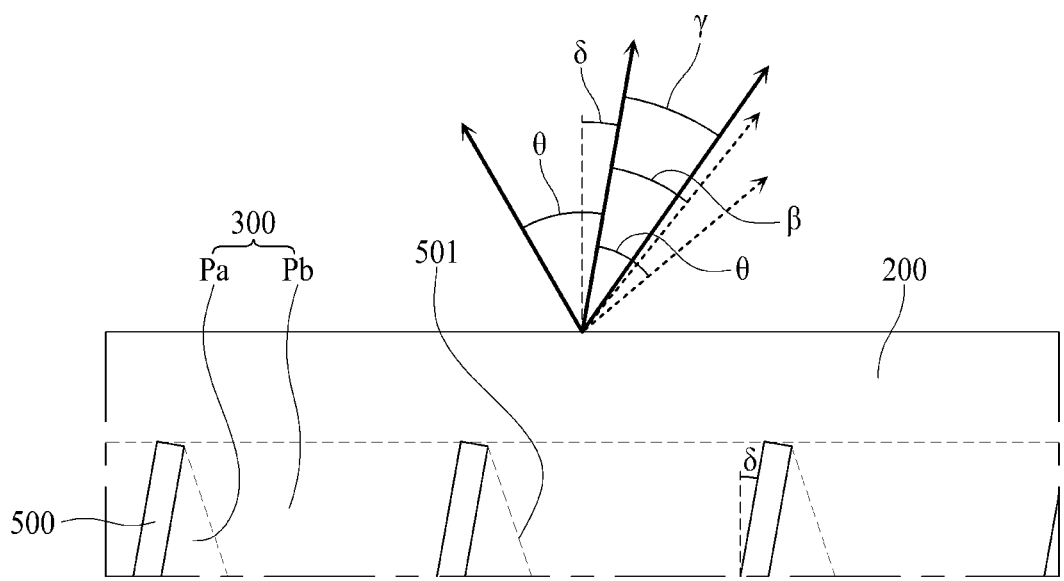
FIG. 9 is a cross-sectional view comparing the ranges of the viewing angles set by the light control films according to the third embodiment to the fifth embodiment of the present disclosure.

Referring to FIG. 9, viewing angles determined by the light control films according to the third to fifth embodiments of the present disclosure are compared. FIG. 9 is a cross-sectional view comparing the ranges of the viewing angles set by the light control films according to the third embodiment to the fifth embodiment of the present disclosure. According to FIG. 9, the left viewing angles according to the third to fifth embodiments may all have the same θ° with respect to the (inclinded) front direction at which the nano light absorbing layer 500 is inclined δ° to the right side. In the interim, for the third embodiment, the right viewing angle is θ° with respect to the front direction inclined δ° to the right side. For the fourth embodiment, the right viewing angle is β° smaller than θ° with respect to the front direction inclined δ° to the right side. For the fifth embodiment, the right viewing angle is γ° smaller than β° with respect to the front direction inclined δ° to the right side.

Hereinafter, referring to FIGS. 10A to 10E, displays having the light control film LCF according to each embodiment of the present disclosure is explained. FIGS. 10A to 10E are cross-sectional views illustrating structures of organic light emitting displays having the light control films according to the first to fifth embodiments of the present disclosure.

Figure 10A:
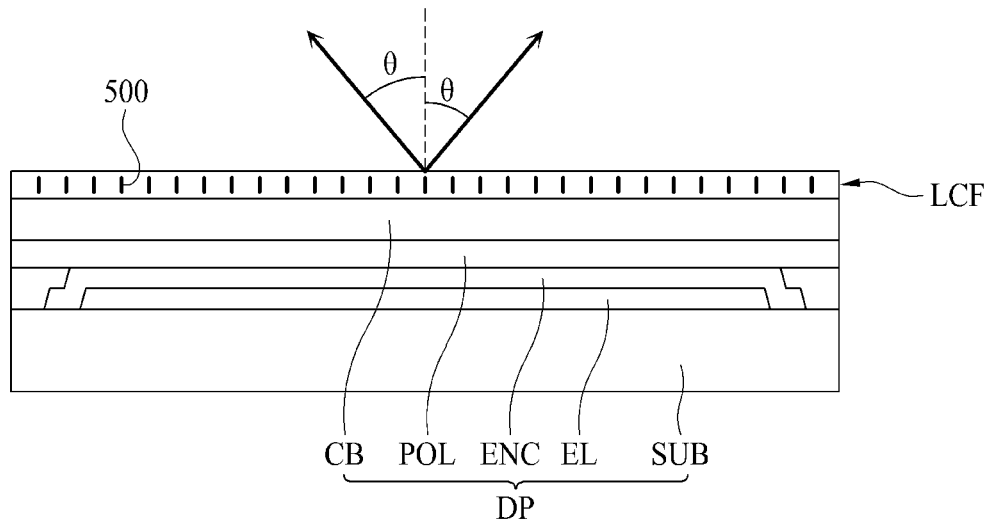
FIGS. 10A to 10E are cross-sectional views illustrating structures of organic light emitting displays having the light control films according to the first to fifth embodiments of the present disclosure.

Referring to FIG. 10A, the display may include a display panel DP and a light control film LCF according to the first embodiment of the present disclosure, and the light control film LCF is disposed on the front surface of the display panel DP. The display panel DP may include a substrate SUB, an emission layer EL formed on the substrate SUB, an encapsulation layer ENC covering the emission layer EL, an optical layer POL disposed on the encapsulation layer ENC and a cover plate CB disposed on the optical layer POL. In some cases, the optical layer POL and the cover plate CB may be formed as an intergrated one body.

The substrate SUB may be preferably formed of a transparent material. The emission layer EL may include a plurality pixel areas arrayed in a matrix manner Each of pixel areas may have a driving element and a light emitting element. The driving element may include a thin film transistor and a storage capacitance. The light emission element may be an electroluminescence element of which brightness of the light may be controlled by the driving element. The electroluminescence element may include an organic light emitting diode or an inorganic light emitting diode.

The encapsulation layer ENC is for protecting the emission layer EL and prevents air or foreign materials from penetrating into the emission layer EL. The encapsulation layer ENC may have a structure in which an inorganic layer and an organic layer are alternately stacked in multiple layers.

The optical layer POL is for improving the characterisitics of the display. It may be a polarizing film to prevent the problem of deterioration the display performance by reflecting light from the outside. For example, the optical layer POL may be a quarter wave plate.

The cover plate CB may be a transparent rigid plate such as glass substrate. The cover plate CB may be a transparent protective substrate for preventing damage due to external force to the optical layer POL, the encapsulation layer ENC and the emission layer EL disposed below the cover plate CB.

The light control film LCF according to the present disclosure may be attached to the outer surface of the cover plate CB. Viewing from the front of the display, when it is necessary to narrow the viewing angel in the vertical direction, it is preferable that the length L of the nano light absorbing layer 500 is disposed along the line from left to right of the display. Otherwise, when it is necessary to narrow the viewing angle in the horizontal direction, it is preferable that the length L of the nano light absorbing layer 500 is disposed along the line from up to down of the display.

Having a structure in which thin layers in nanometer scale of 1.0 μm or less are disposed with intervals of 20 μm or less, the light control film LCF according to the present disclosure may function as a linear polarization film. For example, among the lights incident into the light control film LCF from outside, all of the polarization components along the length direction of the nano light absorbing layer 500 may be absorbed, but only the polarization components along the width direction of the nano light control absorbing layer 500 may be transmitted.

After that, the linearly polarized lights in the width direction (or arrangement direction) of the nano light absorbing layer 500 by the light control film LCF may be converted to circularly polarized lights by the quarter wave plate which is an optical layer POL disposed under the cover plate CB. When this circularly polarized light is reflected from the emission layer EL, the phase of the light may be reversed. For example, when the first circularly polarized light is the left circularly polarized light, then the reflected circularly polarized light is the right circularly polarized light. The circularly polarized light having reversed phase is converted to the linearly polarized light by the quarter wave plate. Here, the direction of the linearly polarized light is along to the length direction of the nano light absorbing layer 500 of the light control film LCF. Therefore, the reflected light may be absorbed by the nano light absorbing layer 500. Consequently, even though the ambient lights are reflected at the emission layer EL of the display, they are not emitted out of the display, but absorbed or eliminated by the nano light absorbing layer 500.

The display having the light control film LCF according to the first embodiment of the present disclosure may have a narrow viewing angle of which ranges from the front direction to the left side and to the right side (or to the upside and to the down side) are each θ°, respectively. Here, the front direction of the display is coincided with the normal direction of the display surface.

As such, the light control film LCF according to the present disclosure may adjust the viewing angle, as well as have a linearly polarization function. Therefore, a separated linear polarization film may be not required to remove the external reflected light. So, the overall thickness of the display may be ensured thinner than related art.

Figure 10B:
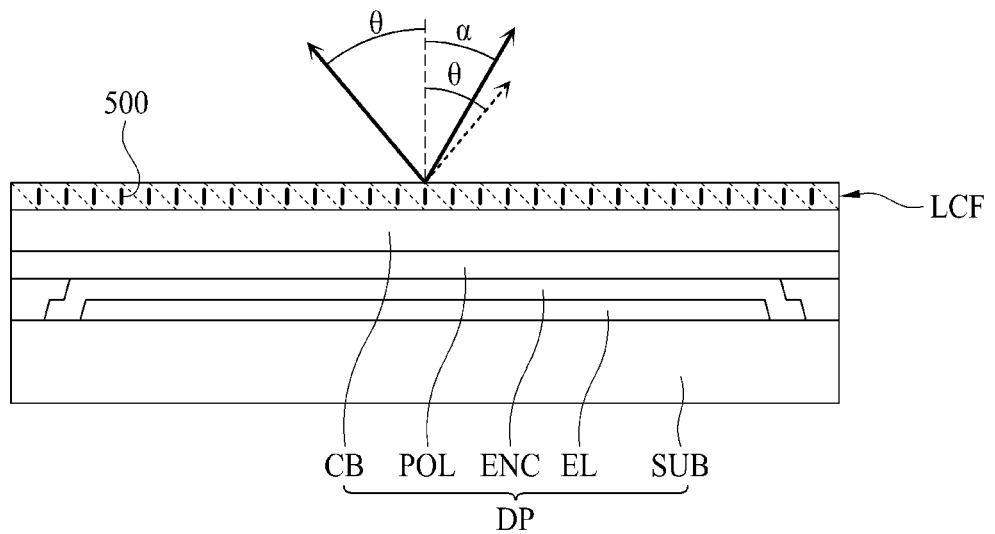

Referring to FIG. 10B, the display may include a display panel DP and a light control film LCF according to the second embodiment of the present disclosure, and the light control film LCF is disposed at the front surface of the display panel DP. Since the display panel DP is the same as the FIG. 10A, detailed description is omitted. The light control film LCF may have a structure in which the middle layer 300 is divided into a lower prism part Pa and an upper prism part Pb. Especially, the upper prism part Pb may have a lower refractive index than the lower prism part Pa. In this case, the left viewing angle may be θ°, while the right viewing angle may be α° smaller than θ°. That is, the display may have an asymmetric narrow viewing angle.

Figure 10C:
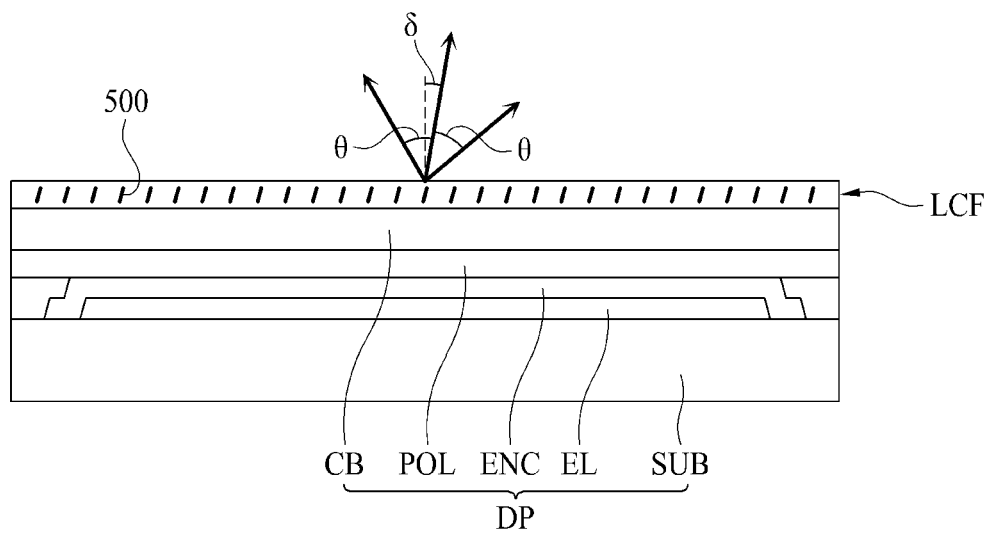

Referring to FIG. 10C, the display according to the third embodiment of the present disclosure may include a display panel DP and a light control film LCF disposed at front surface of the display panel DP. The display panel DP may have the same structure as shown in FIG. 10A, detailed explain may be not duplicated. The light control film LCF may have a nano light absorbing layer 500 having a structure inclined δ° in the right direction based on the normal of the surface of the light control film LCF. The display including the light control film LCF according to the third embodiment may have the front direction which may be set on the direction inclined δ° from the normal direction of the display surface. In addition, the viewing angle from the front direction to left side may have a narrow viewing angle of θ°, and the viewing angle from the front direction to right side may also have the narrow viewing angle of θ°.

Figure 10D:
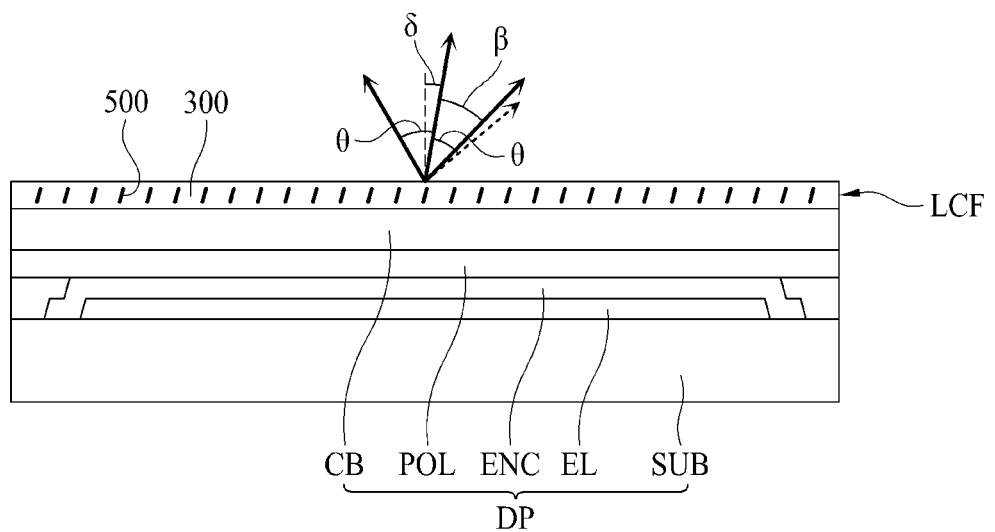

Referring to FIG. 10D, the display according to the fourth embodiment of the present disclosure may comprise a display panel DP and a light control film LCF disposed on the front surface of the display panel DP. The display panel DP may have the same structure as shown in FIG. 10A, detailed explain may be not duplicated. The light control film LCF may have a nano light absorbing layer 500 having a structure inclined δ° in the right direction based on the normal of the surface of the light control film LCF. The display including the light control film LCF according to the third embodiment may have the front direction which may be set on the direction inclined δ° from the normal direction of the display surface.

In this embodiment, the nano light absorbing layer 500 may have a lower refractive index than the middle layer 300. Therefore, lights that may be reflected from the nano light absorbing layer 500 may be also refracted into the nano light absorbing layer 500 so that the reflective ratio may be reduced. As the result, leakage lights outside the narrow viewing angle of θ° to left side and to right side from the front direction, respectively, may be removed, so that the viewing angle may be narrower than θ°. Especially, the viewing angle to the side where the light absorbing layer 500 is inclined may be selectively narrower.

As the result, the display having the light control film LCF according to the fourth embodiment may have the viewing angle ranges in which a left viewing angle is θ° based on the front direction inclined δ° from the normal direction of the display surface, while a right viewing angle is β° smaller than θ° based on the front direction. That is, the asymmetric narrow viewing angle may be implemented.

Figure 10E:
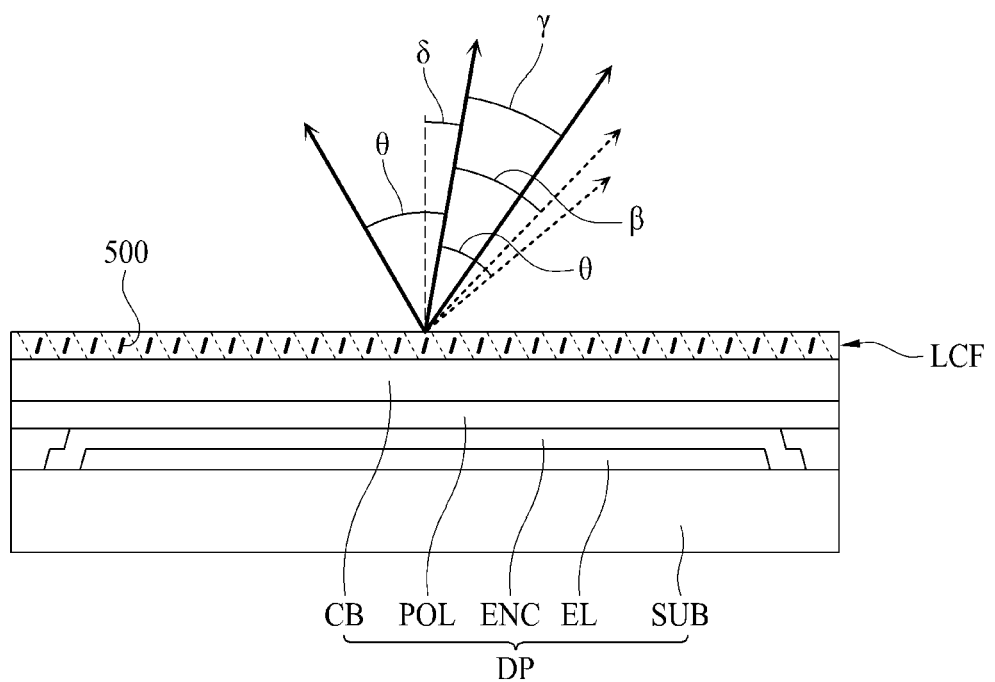

Referring to FIG. 10E, the display according to the fourth embodiment of the present disclosure may include a display panel DP and a light control film LCF disposed on the front surface of the display panel DP. The display panel DP may have the same structure as shown in FIG. 10A, detailed explain may be not duplicated. The light control film LCF may have a nano light absorbing layer 500 having a structure inclined δ° in the right direction based on the normal of the surface of the light control film LCF. The display including the light control film LCF according to the third embodiment may have the front direction which may be set on the direction inclined δ° from the normal direction of the display surface.

In this embodiment, the nano light absorbing layer 500 may have a lower refractive index than the middle layer 300. Therefore, lights that may be reflected from the nano light absorbing layer 500 may be also refracted into the nano light absorbing layer 500 so that the reflective ratio may be reduced. As the result, leakage lights outside the narrow viewing angle of θ° to left side and to right side from the front direction, respectively, may be removed, so that the viewing angle may be narrower than θ°. Especially, the viewing angle to the side where the light absorbing layer 500 is inclined may be selectively narrower.

Furthermore, the light control film LCF may have a structure in which the middle layer 300 may have a lower prism part Pa and an upper prism part Pb. Especially, the upper prism part Pb may have the refractive index lower than that of the lower prism part Pa. In this case, the left viewing angle may be θ°, while the right viewing angle may be γ° smaller than θ°. Especially, the γ° is smaller than β°. That is, the asymmetric narrow viewing angle may be implemented.

In the various embodiments and drawings of the present disclosure described so far, we explained as focusing on the case where the light control film LCF is bonded on the upper surface of the cover plate CB. Otherwise, depending on the needs of the product configuration, the light control film LCF may be attached at the inner surface of the cover plate CB. For an example, the light control film LCF may be disposed between the cover plate CB and the optical layer POL. For another example, the cover plate CB may be not included. In this case, the optical layer POL, the encapsulation layer ENC and the emission layer EL may be sequentially stacked up to down under the cover plate CB.

Features, structures, effects and so on described in the above described examples of the present disclosure are included in at least one example of the present disclosure, and are not necessarily limited to only one example. Furthermore, features, structures, effects and so on exemplified in at least one example of the present disclosure may be implemented by combining or modifying other examples by a person having ordinary skilled in this field. Therefore, contents related to such combinations and modifications should be interpreted as being included in the scope of the present application.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:
1. A light control film comprising:
a lower layer having a first axis and a second axis;
a middle layer having a thickness disposed between the lower layer and an upper layer; and
a plurality of nano light absorbing layers arrayed with predetermined intervals along the first axis in the middle layer, each of the nano light absorbing layer having a width along the first axis, a length along the second axis and a height corresponding to the thickness of the middle layer,
wherein a ratio between the interval and the width of the nano light absorbing layer is in a range of 10:1 to 20:1,
wherein the plurality of nano light absorbing layers includes a first nano light absorbing layer and a second nano light absorbing layer neighboring with the interval between each other, and
wherein the middle layer includes a lower prism part and an upper prism part, the lower prism part positioned at a lower area based on an inclined surface connecting from an upper end of the first nano light absorbing layer to a lower end of the second nano light absorbing layer, and the upper prism part positioned at an upper area based on the inclined surface.

2. The light control film according to claim 1, wherein the width of the nano light absorbing layer is in a range of 0.1 μm to 1.0 μm.

3. The light control film according to claim 1, wherein the ratio between the interval and the height of the nano light absorbing layer is in a range of 1:1 to 1:4.

4. The light control film according to claim 1, wherein each of the lower layer, the middle layer, and the upper layer have refractive indices higher than that of air, respectively.

5. The light control film according to claim 1, wherein each of the nano light absorbing layer has at least two thin layers stacked with each other.

6. The light control film according to claim 5, wherein any one thin layer of the nano light absorbing layer has a film thickness in a range of 0.01 μm to 0.1 μm.

7. The light control film according to claim 1, wherein the nano light absorbing layer includes:
a first thin layer having a first reflection ratio; and
a second thin layer having a second reflection ratio different from the first reflection ratio.

8. The light control film according to claim 7, wherein the nano light absorbing layer further includes a third thin layer having a third reflection ratio different from the first reflection ratio and the second reflection ratio.

9. The light control film according to claim 1, wherein the nano light absorbing layer includes:
a first thin layer having a first transmittance ratio; and
a second thin layer having a second transmittance ratio different from the first transmittance ratio.

10. The light control film according to claim 9, wherein the nano light absorbing layer further includes a third thin layer having a third transmittance ratio different from the first transmittance ratio and the second transmittance ratio.

11. The light control film according to claim 1, wherein the lower prism part has a first refractive index, and
wherein the upper prism part has a second refractive index lower than the first refractive index.

12. The light control film according to claim 1, wherein the upper layer, the lower layer, and the middle layer include a transparent organic material, and
wherein the nano light absorbing layer includes a material absorbing visible lights.

13. The light control film according to claim 12, wherein the nano light absorbing layer includes at least selected one of silicon nitride (SiN), titanium nitride (TiN), silicon carbide (SiC), Tantalium (Ta), Titanium (Ti), Tungsten (W), Nickel (Ni), copper oxide (CuO), aluminum oxide (Al2O3), iron oxide (Fe3O4), nickel oxide (NiO) and tantalum oxide (Ta2O5).

14. The light control film according to claim 1, wherein the nano light absorbing layer is disposed as being slanted at a predetermined angle in one direction based on a normal direction of a plan surface of the light control film.

15. The light control film according to claim 14, wherein the nano light absorbing layer has a refractive index lower than refractive indices of the upper layer, the lower layer, and the middle layer.

16. The light control film according to claim 14, wherein the upper layer, the lower layer, and the lower prism part have a first refractive index,
wherein the upper prism part has a second refractive index lower than the first refractive index, and
wherein the nano light absorbing layer has a third refractive index lower than the second refractive index.

17. The light control film according to claim 16, wherein the inclined surface of the middle layer is slanted as being crossing with a viewing angle direction having narrower than an opposite direction based on the slanted direction of the nano light absorbing layer.

18. A display comprising:
a substrate having a plurality of pixels;
an emission layer including a driving element and a light emitting element disposed at each of pixels;
an encapsulation layer covering the emission layer;
an optical layer on the encapsulation layer;
a cover plate on the optical layer; and
the light control film according to claim 1.

* * * * *